United States Patent [19]

Waltrip

[11] 4,272,958
[45] Jun. 16, 1981

[54] ANTI-POLLUTION TREATING DEVICE
[75] Inventor: Owen R. Waltrip, Roseville, Calif.
[73] Assignee: U.S. Emission Systems, Inc., Casper, Wyo.
[21] Appl. No.: 37,115
[22] Filed: May 8, 1979
[51] Int. Cl.³ .......................... F01N 3/02; F28D 7/12
[52] U.S. Cl. ...................................... 60/309; 60/310; 60/320; 165/51; 165/125; 165/140
[58] Field of Search ................. 60/309, 310, 311, 320; 165/51, 52, 174, 140, DIG. 18, 125; 417/423

[56]  References Cited
U.S. PATENT DOCUMENTS

| | | | |
|---|---|---|---|
| 1,589,412 | 6/1926 | Mitchell | 165/125 |
| 1,779,538 | 10/1930 | Grady | 165/140 |
| 2,294,350 | 8/1942 | Price | 165/125 |
| 3,456,439 | 7/1969 | Hale | 60/320 |
| 3,630,030 | 12/1971 | Wagner | 60/310 |
| 3,691,772 | 9/1972 | Cross | 60/320 |
| 3,700,029 | 10/1972 | Thrun | 165/51 |
| 3,748,830 | 7/1973 | Ross | 60/320 |
| 3,831,377 | 8/1974 | Morin | 60/309 |
| 3,850,230 | 11/1974 | Margen | 165/140 |
| 3,927,526 | 12/1975 | Tedrow | 60/309 |

FOREIGN PATENT DOCUMENTS 2149506   4/1972   Fed. Rep. of Germany ............. 60/309

Primary Examiner—Douglas Hart
Attorney, Agent, or Firm—Harvey B. Jacobson

[57] ABSTRACT

Combustion products having water vapor mixed therewith are conducted along a helical path by a heat transfer conduit in surrounding relation to a cylindrical cooling zone. A blower at one axial end of said cooling zone induces an axial inflow of air that is radially discharged through the gaps between adjacent coil sections of the heat transfer conduit causing condensation of the water and entrainment therein of noxious components of the combustion products. Additional cooling may be provided through an evaporator coil within the cooling zone.

15 Claims, 3 Drawing Figures

ANTI-POLLUTION TREATING DEVICE

BACKGROUND OF THE INVENTION

This invention relates in general to the treatment of combustion product exhaust from sources, such as combustion engines, and fuel burning furnaces for anti-pollution purposes.

One generally known method of treating combustion exhaust products involves the cooling of the exhaust by passage through a heat exchanger. Cooling is effect by an air blower, a refrigeration evaporator coil, indirect heat exchange with a coolant, or by combinations of the foregoing cooling methods. Air blower cooling of engine exhaust is disclosed, for example, in U.S. Pat. No. 3,927,526 to Tedrow, for the primary purpose of condensing out fog-producing components. According to U.S. Pat. No. 2,403,774 to Whitly et al, engine exhaust is cooled by heat exchange with coolant to condense water vapor for return to a water injection fuel system associated with an internal combustion engine. According to U.S. Pat. No. 3,101,588 to Perry, engine exhaust products are conducted through a helical conduit for heat exchange with a water spray to generate steam.

Cooling of exhaust products for removal of atmospheric polluting components is also known. U.S. Pat. No. 3,691,772 to Cross, for example, discloses a condenser including a helical conduit through which the exhaust gas is conducted in parallel with flow through a muffler for condensing hydrocarbon material. According to U.S. Pat. No. 3,782,115 to Johnson, nitrogen dioxide is removed in a contact type separator after sequential air cooling of the exhaust gas and condensing of water therefrom by an evaperator cooling coil associated with an automotive air conditioning system. Some hydrocarbons and nitrogen dioxide are allegedly dissolved or carried off with the condensate for the primary purpose of extracting the nitrogen dioxide from the gas ultimately discharged to atmosphere.

It is therefore an important object of the present invention to provide improved apparatus for more efficiently and precisely cooling exhaust products in a single cooling zone to a temperature at which noxious components and more completely separated out by entrainment in the liquid condensate discharged from the cooling zone.

SUMMARY OF THE INVENTION

In accordance with the present invention, combustion products containing water vapor are cooled within the radially outer portion of a single cooling zone through the heat transfer walls of a helical conduit cross-sectionally dimensioned to conduct the combustion products at the proper flow rate. Cooling facilities are confined to the radially inner core of the cooling zone for cooling the combustion products while traveling along a helical path.

The cooling facilities include an air blower at the upstream end of the cooling zone inducing an axial inflow of air. The downstream end of the cooling zone is closed so as to block any axial outflow thereby confining outflow to the axial gaps between the coil sections of the helical conduit. Axially spaced baffle plates within the inner core of the cooling zone regulate axial distribution of the radial outflow of air from the cooling zone and the distribution of its cooling effect on the helical conduit. The baffle plates also support an auxiliary cooling coil such as an air conditioning evaporator coil.

Temperature adjustment is necessary to obtain optimum separation of noxious components for discharge with the liquid condensate formed internally within the helical conduit and may be effected manually. Toward that end, the air blower speed is manually adjusted through a blower motor speed control while a manually operable valve control adjusts flow of refrigerant coolant through the baffle plate mounted cooling coil.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWING FIGURES

DETAILED DESCRIPTION OF A SPECIFIC EMBODIMENT

Figure 1:
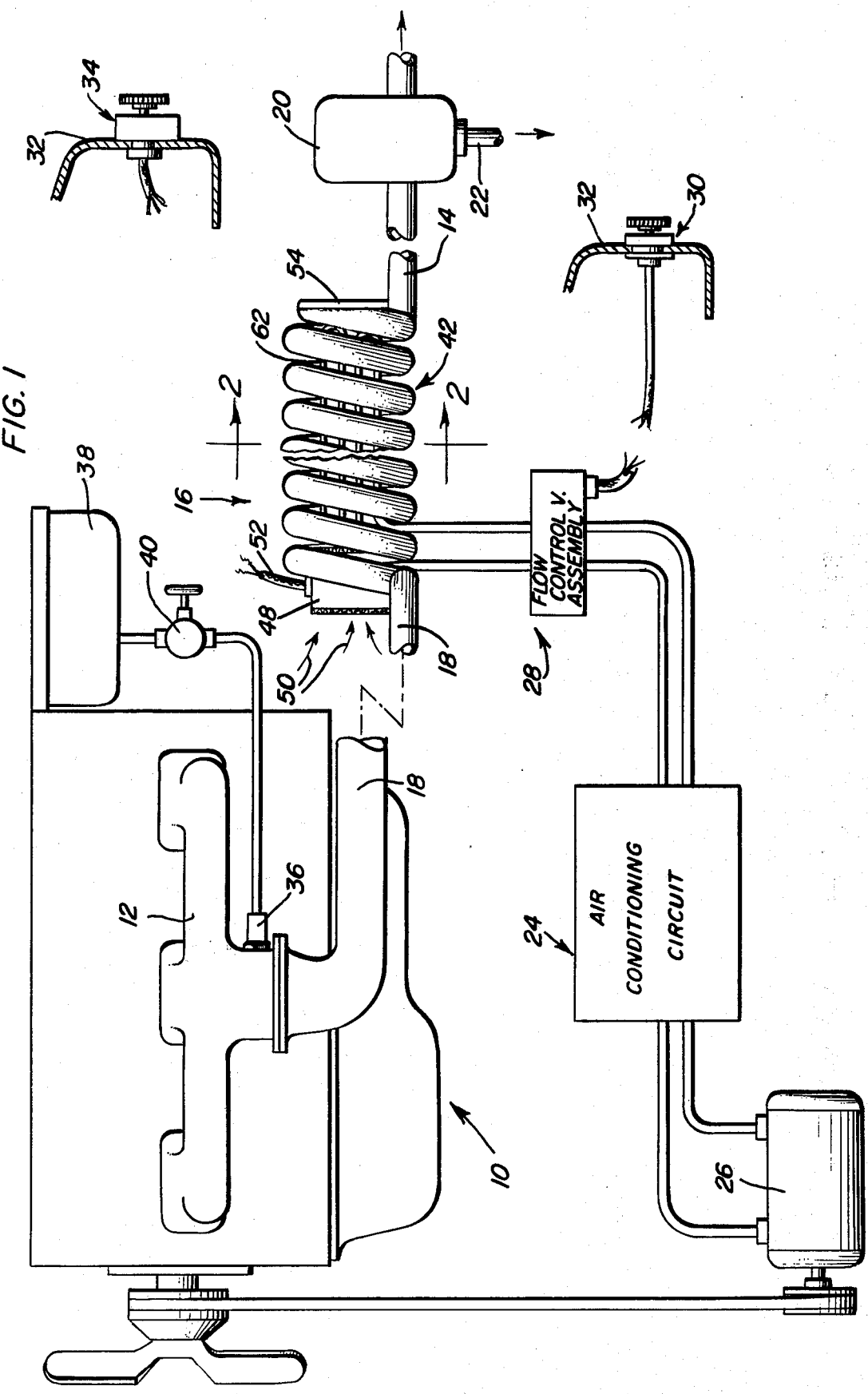
FIG. 1 is a simplified and somewhat schematic side elevation view illustrating a typical installation of the present invention.

Referring to the drawings in detail, FIG. 1 illustrates one installation of the present invention wherein the source of combustion products is a conventional internal combustion engine 10 of an automotive vehicle having an exhaust system which includes the usual exhaust manifold 12 and a tail pipe 14 from which combustion products are discharged to atmosphere. In accordance with the present invention as applied to the automotive vehicle installation depicted in FIG. 1, the usual muffler and any emission controls such as catalytic converters are removed from the exhaust system and replaced by an anti-pollution device generally referred to by reference numeral 16. The device 16 is therefore interconnected between the exhaust conduit 18 extending from the manifold 12 and the tail pipe 14 and serves to not only separate out noxious components of the combustion products for discharge in a liquid condensate, but also functions as a muffler to remove noise pollution. A small exhaust baffling device 20 may be inserted between the device 16 and the tail pipe, if desired, in order to separate out the liquid condensate with noxious components carried therein through outlet 22 leaving a harmless, non-toxic gaseous discharge from the tail pipe 14. If device 20 omitted, the condensate is discharged with the gaseous components to deposit the noxious components on the ground in a harmless state.

Supporting equipment associated with the device 16 includes a refrigeration circuit such as the vehicle air conditioning system 24 of a type well-known in the art which is appropriately modified as will be explained hereinafter. The air conditioning system is energized through its engine driven, refrigerant compressor 26, supplying refrigerant under a circulating pressure to the device 16 through a flow control valve 28. A valve control 30 mounted on the vehicle dash 32 and connected to the control valve 28 enables the driver to either shut off the valve when no cooling from system 24 is desired or regulate the amount of cooling necessary. Another dash-mounted control 34 in the form of a motor speed controlling rheostat is provided to enable the driver to regulate cooling within device 16 as will be explained hereinafter. Also, a water injector 36 is mounted on the exhaust manifold 12 connected to a water tank 38 through a valve 40. Since a minimum quantity of water vapor in the exhaust must be present for operation of the invention, the water injector is provided for possible supply water under certain conditions.

Figure 3:
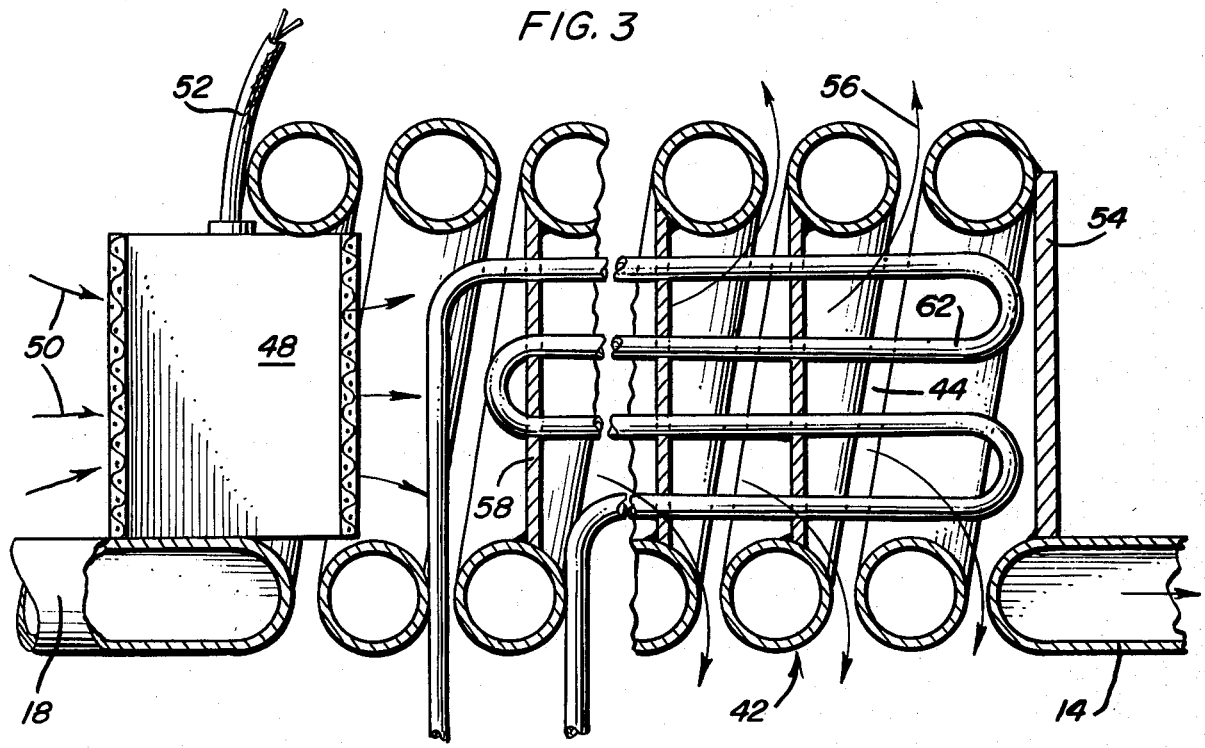
FIG. 3 is a partial side section view taken substantially through a plane indicated by section line 3—3 in FIG. 2.
Figure 2:
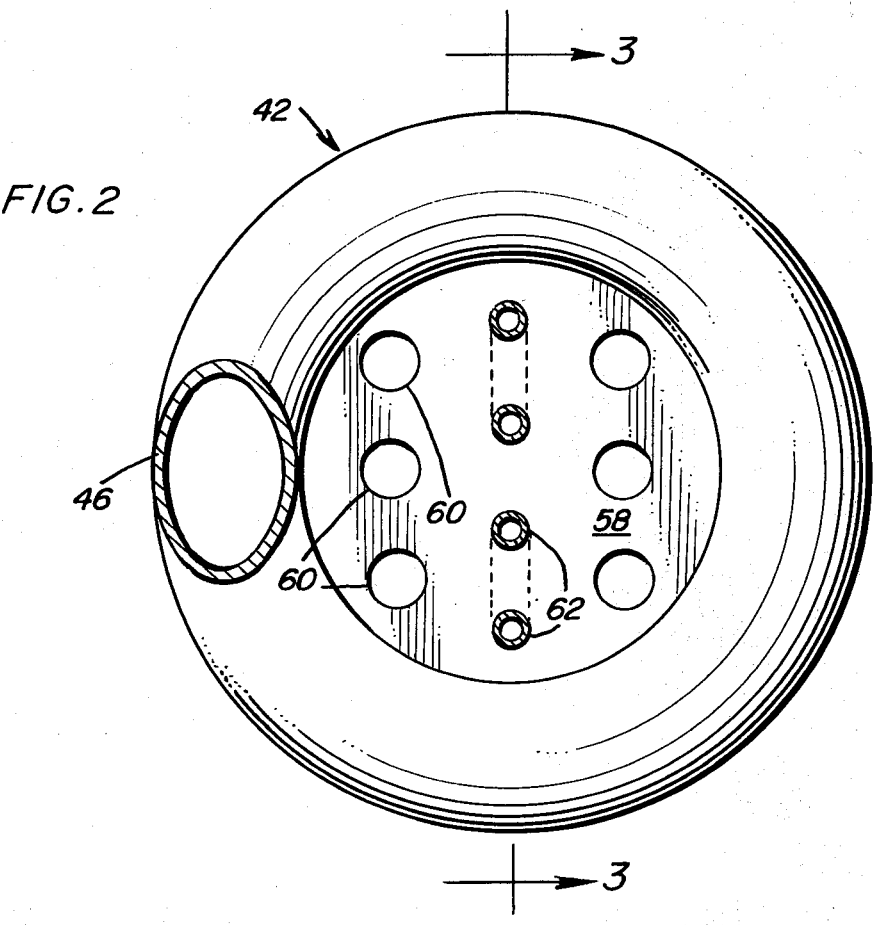
FIG. 2 is an enlarged transverse section taken substantially through a plane indicated by section line 2—2 in FIG. 1.

Referring now to FIGS. 2 and 3, the device 16 is shown in detail. The exhaust conduit 18 and tail pipe 14 are respectively connected to the upstream and downstream ends of a helical conduit 42 occupying the radially outer portion of a cylindrical cooling zone 44. The conduit 42 conducts the combustion products along a helical path and has heat transfer walls through which the combustion products are cooled by contact with air. Axial gaps between the coil section 46 of the conduit provide complete exposure of the conduit to the air for cooling purposes.

At the upstream axial end of the helical conduit 42, a motor driven blower 48 induces an axial inflow of air to the cooling zone as indicated by arrows 50 in FIG. 3. The blower motor is wired by cable 52 to the dash-mounted control 34. The opposite downstream end of the cooling zone is closed by wall 54 so as to block any axial outflow of air. The outflow of air from the zone 44 therefore proceeds radially through the gaps between the coil sections 46 as indicated by arrows 56 in FIG. 3.

Fixed to the coil sections 46 of the conduit within the cooling zone 44 are a plurality of axially spaced baffle plates 58 having openings 60 therein to regulate the axial flow of air through the cooling zone for distribution of the air outflow. Progressive cooling of combustion products while traveling in a helical path through conduit 42 is thereby assured for precise temperature control purposes. The baffle plates 58 also support an evaporator type of refrigerant cooling coil 62 connected to the flow control valve 28 aforementioned. Thus, cooling may be effected through coil 62 by an amount adjusted through valve control 30 to obtain the requisite cooling temperature.

Although the present invention is applicable to any source of combustion products, it was installed and tested on an automotive vehicle powered by an 8-cylinder, 490 cubic inch engine operating at 2000 RPM. The exhaust manifold temperature was 295° F. while the temperature of conduit 18 was 245° F. Without any cooling from the evaporator coil 62, a blower 48 having a 5 inch fan blade was operated at 1480 RPM producing a maximum of 137 cubic feet per minute of air inflow to the cooling zone. A progressive reduction in temperature of the exhaust products in conduit 42 was reflected by measurement of the temperature of the coil sections 46. Utilizing 15 coil sections, the temperature decreased from 220° F. at the first coil section to 119° F. at the last coil section. Under such conditions, a substantially pollution-free gaseous exhaust was obtained at the tail pipe 14. Comparative testing of the foregoing embodiment of the invention was performed by analysis of the exhaust at the tail pipe in accordance with standard testing apparatus and procedures mandated under the laws of the State of California. The test results are shown in the following table:

| TEST NO. | ENGINE SPEED POLLUTANTS | IDLE 600 RPM | | CRUSING 2000 RPM | |
| --- | --- | --- | --- | --- | --- |
| | | CO | HC | CO | HC |
| 1. | No pollution controls | 1.50 | 100 | 0.25 | 100 |
| 2. | With device 16 and no water trap 20 | 0.50 | 100 | 0.25 | 75 |
| 3. | With device 16 and water trap 29 | 0.25 | 25 | 0.25 | 0 |

*CO = carbon monoxide parts per millions
*HC = hydrocarbon parts per million

As indicated in the foregoing table, a dramatic improvement was obtained in emission control with respect to hydrocarbon pollutants at engine speeds of 2000 RPM, and also with respect to carbon monoxide under engine idling conditions.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a source of combustion products and an exhaust system through which the combustion products are discharged to atmosphere through a tail pipe, an anti-pollution device including heat transfer conduit means enclosing a single cooling zone for exclusively conducting said combustion products from said source to the tail pipe along a helical path, cooling means disposed in said cooling zone for conducting coolant in non-contacting heat exchange relation to the combustion products during travel thereof along said helical path, and control means connected to the cooling means for controlling cooling of the combustion products by the coolant to effect separation of noxious components of the combustion products by entrainment in liquid condensate formed internally within the conduit means.

2. The combination of claim 1 wherein said source of combustion products is an internal combustion engine.

3. The combination of claim 2 including means for injecting water into the exhaust system upstream of the anti-pollution device.

4. The combination of claim 1 including means for injecting water into the exhaust system upstream of the anti-pollution device.

5. In combination with a source of combustion products and an exhaust system through which the combustion products are discharged to atmosphere, an anti-pollution device including heat transfer conduit means enclosing a single cooling zone for conducting said combustion products from said source along a helical path, cooling means disposed in said cooling zone coolant in heat exchange relation to the combustion products during travel along said helical path, and control means connected to the cooling means for controlling cooling of the combustion products by the coolant to a predetermined temperature causing separation of noxious components of the combustion products by entrainment in liquid condensate formed internally within the conduit means, said conduit means being formed by a helical coil having spaced coil sections, said cooling means including a plurality of axially spaced baffles surrounded by the helical coil and coolant conducting tubes supported by the baffles.

6. The combination of claim 5 wherein said cooling means includes a blower inducing an axial inflow of air discharged radially outward between the spaced coil sections and closure means connected to the helical coil at one axial end of the cooling zone blocking axial outflow of the air therefrom.

7. The combination of claim 6 wherein said blower is mounted within the coil at an end opposite said one axial end.

8. The combination of claim 7 wherein said control means includes speed regulating means connected to the blower for adjusting the volumetric rate of air inflow into the coil.

9. The combination of claim 8 wherein said control means further includes means for regulating flow of coolant through said tubes.

10. The combination of claim 5 wherein said control means includes means for regulating flow of coolant through said tubes.

11. The combination of claim 6 wherein said control means includes speed regulating means connected to the blower for adjusting the volumetric rate of air inflow into the coil.

12. The combination of claim 11 wherein said blower is mounted with the coil at an end opposite said one axial end.

13. In combination with a source of combustion products having water vapor mixed therewith and a tail pipe from which the combustion products are discharged to atmosphere, an anti-pollution device comprising helical conduit means for exclusively conducting said combustion products from said source to the tail pipe, blower means mounted at one axial end of the conduit means for inducing an axial inflow of air to a cooling zone enclosed by said conduit means, means blocking axial outflow of air from said cooling zone for confining flow of the air radially outward from said cooling zone, and speed regulating means connected to the blower means for controlling cooling of the conduit means by said inflow of air to a predetermined temperature range causing condensation of the water vapor and entrainment therein of noxious components of the combustion products during travel thereof through the conduit means.

14. The combination of claim 13 including baffle means enclosed by the conduit means in said cooling zone for axially distributing outflow of the air therefrom.

15. In combination with a source of combustion products having water vapor mixed therewith, an anti-pollution device comprising helical conduit means for conducting said combustion products from said source, blower means mounted at one axial end of the conduit means for inducing an axial inflow of air to a cooling zone enclosed by said conduit means, means blocking axial outflow of air from said cooling zone for confining flow of the air radially outward from said cooling zone, and speed regulating means connected to the blower means for controlling cooling of the conduit means by said inflow of air to a predetermine temperature causing condensation of the water vapor and entrainment therein of noxious components of the combustion products during travel through the conduit means, baffle means enclosed by the conduit means in said cooling zone for axially distributing outflow of the air therefrom, and a refrigeration system having evaporator coil means supported by the baffle means within said cooling zone for additional cooling of the conduit means.

* * * * *